United States Patent [19]

Tanis

[11] Patent Number: 4,961,349
[45] Date of Patent: Oct. 9, 1990

[54] FLOW METER

[76] Inventor: Steven W. Tanis, 6507 S. Adler, Tempe, Ariz. 85283

[21] Appl. No.: 408,076

[22] Filed: Sep. 15, 1989

[51] Int. Cl.$^5$ .......................... G01F 1/40; G01F 1/44
[52] U.S. Cl. ................................ 73/861.52; 73/861.63
[58] Field of Search ........... 73/861.52, 861.61, 861.62, 73/861.63, 861.64, 215

[56] References Cited

U.S. PATENT DOCUMENTS

| | | | |
|---|---|---|---|
| 1,805,236 | 5/1931 | Connet | 73/861.63 X |
| 4,095,466 | 6/1978 | Schontzler et al. | 73/215 |
| 4,168,725 | 9/1979 | Astanov et al. | 73/861.61 X |
| 4,799,388 | 1/1989 | Hunter | 73/215 X |

Primary Examiner—Herbert Goldstein
Attorney, Agent, or Firm—Tod R. Nissle

[57] ABSTRACT

Fluid flow measurement apparatus. The apparatus reduces the normal cross sectional area of a portion of the conduit and produces laminar fluid flow through the portion of the conduit having a reduced cross sectional area. The hydraulic grade differential is determined between the fluid pressures in the reduced cross sectional area and the pressure of fluid flowing through a portion of the conduit having a normal cross sectional area.

2 Claims, 2 Drawing Sheets

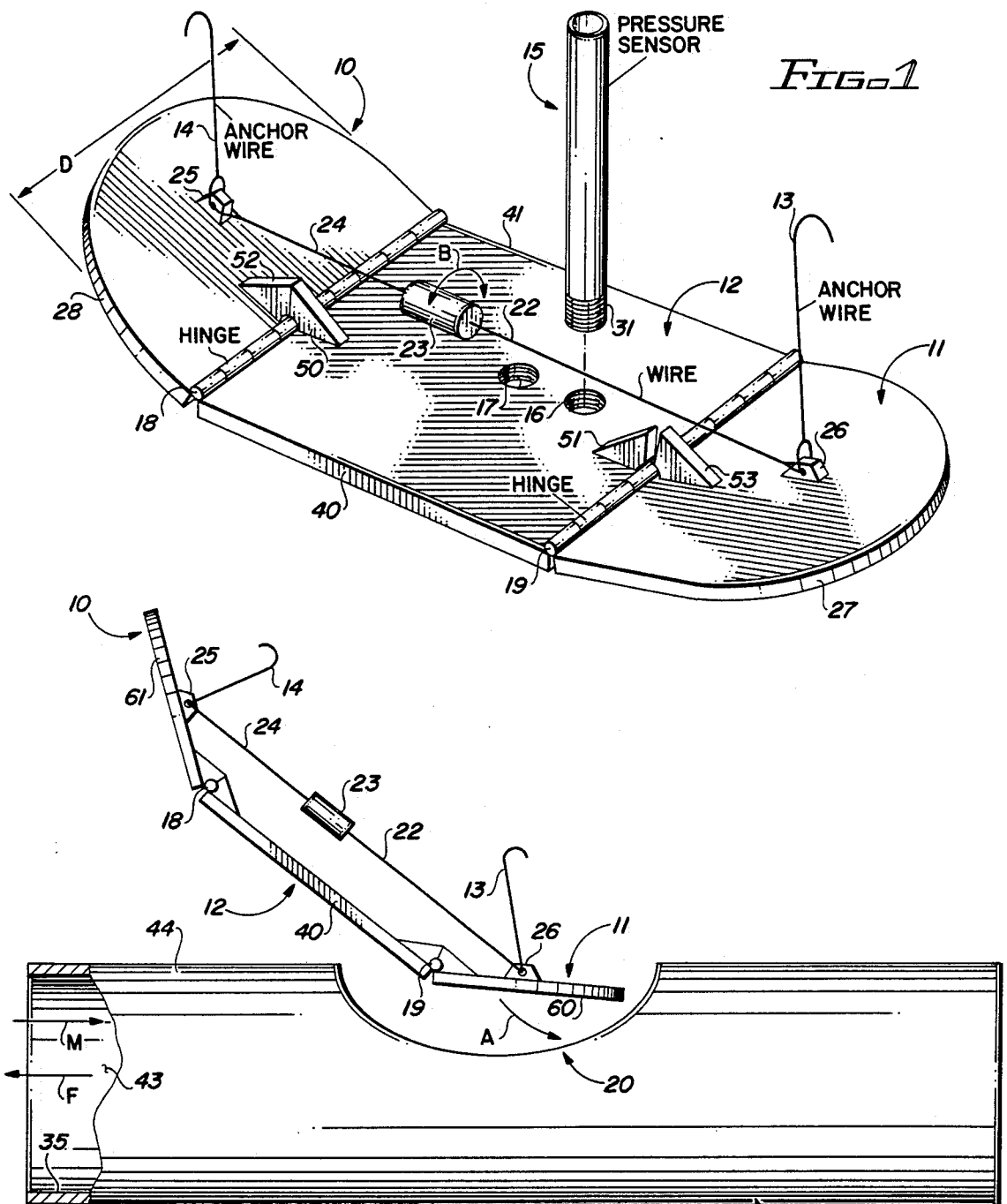

FLOW METER

This invention relates to apparatus for measuring the flow of fluid through a conduit by determining the hydraulic grade differential of the fluid.

In a further respect, the invention pertains to apparatus for measuring the flow of fluid through an existing assembled conduit network, the apparatus permitting the accurate measurement of fluid flow, being readily installed in the existing conduit network, and requiring minimal maintenance when the apparatus is left installed in the conduit network.

Fluid delivery conduit networks are utilized in chemical plants, in city drinking water supply systems, in sewage disposal systems, in systems for delivering and transporting oil, in water irrigation systems, and in other conventional fluid transport and treatment systems. In such systems, it is often desirable to accurately measure the amount of fluid delivered by the system during a selected period of time. When the conduit network utilized in a fluid delivery system is buried, either at the time of construction or at some time subsequent to construction of the delivery system, obtaining an accurate measurement of fluid flow through the system is difficult. Excavating and partially disassembling an existing conduit network to install fluid flow measurement instruments is not economically practical. Further, even when a line in a conduit network is exposed to view, disassembling the line to retrofit the line with fluid flow measurement instruments is often not commercially or aesthetically practical.

Accordingly, it would be highly desirable to provide improved fluid flow measurement apparatus which would accurately measure the fluid flow in a conduit line and which could be readily installed in existing conduit lines at minimal expense while maintaining the structural reliability and appearance of the conduit line.

Therefore, it is a principal object of the invention to provide improved apparatus for measuring fluid flow in irrigation conduits and other types of fluid transport conduits.

A further object of the invention is to provide improved apparatus which measures the fluid flow through a conduit by measuring the hydraulic grade differential of the fluid moving through the conduit.

Another object of the invention is to provide improved fluid flow measuring apparatus which can be installed in a conduit line without requiring that both ends of a cylindrical conduit section be freed and that the conduit section be removed from the line to install the flow measurement apparatus.

Still another object of the invention is to provide improved fluid flow measurement apparatus which produces a hydraulic grade differential of fluid flowing through a conduit by reducing the cross sectional area of a selected portion of the conduit and by producing laminar fluid flow through the portion of conduit having a reduced cross sectional area.

These and other further and more specific objects and advantages of the invention will be apparent to those skilled in the art from the following detailed description thereof, taken in conjunction with the drawings, in which:

FIG. 1 is a perspective view illustrating fluid flow measurement apparatus constructed in accordance with the principles of the invention;

FIG. 2 is an elevation view illustrating the installation of the measurement apparatus of FIG. 1 in a conduit;

Figure 3:
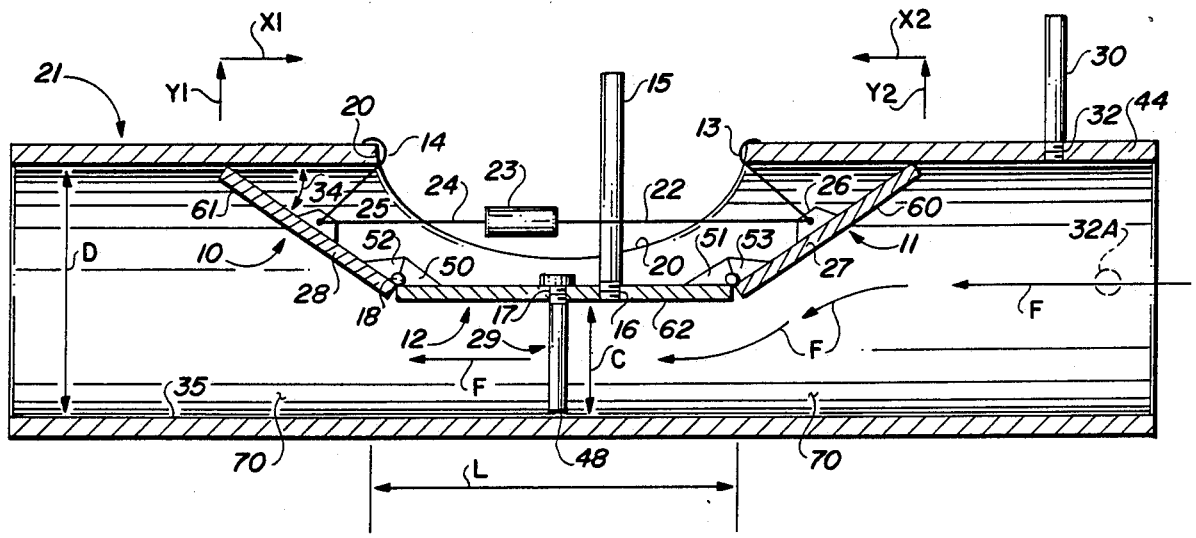
FIG. 3 is a side section view of a conduit illustrating the mode of operation of the fluid flow measurement apparatus of FIG. 1.

Briefly, in accordance with my invention, I provide, in combination with a conduit, the improvement comprising means for measuring the flow of a fluid through the conduit by determining the hydraulic grade differential of fluid flowing through the conduit. The conduit includes a central space through which fluid flows along the conduit and includes a wall having an inner surface circumscribing the central space. The central space has, at each point along the length of the conduit, a cross sectional area perpendicular to the direction of flow of fluid through the conduit. The means for measuring fluid flow includes at least one opening formed through the wall of the conduit; an elongate member positioned inside the conduit at a selected location along the conduit to restrict the normal flow of fluid through the conduit and including a peripheral edge shaped and dimensioned to generally sealingly continuously engage the inner surface of the conduit at points circumscribing the opening to prevent fluid from flowing intermediate the inner wall surface and the peripheral edge and out through the opening, and an outer surface extending from the peripheral edge outwardly away from the wall into the central space of the conduit to block a portion of the cross sectional area of the conduit at selected points along the length of the conduit, the outer surface including a central planar portion shaped and dimensioned to produce laminar flow in fluid flowing through the restricted portion of the cross sectional area remaining intermediate the central planar portion and a portion of the inner surface opposing and spaced away from the central planar portion; a first aperture formed in the central planar portion and in fluid communication with the restricted portion of the cross sectional area; means connected to the first aperture to measure the pressure of laminar fluid flow intermediate the central planar portion and the opposing portion of the inner wall surface; a second aperture formed in the wall of the conduit in a portion of the conduit selected from the pair comprising a section of the conduit upstream from the elongate member and a section of the conduit downstream from the elongate member, the upstream and downstream sections having fluid flowing through the cross sectional area of the sections, the second aperture being in fluid communication with the central planar portion of the conduit; means connected to the second aperture to measure the pressure of fluid flowing through the selected portion of the conduit; and, anchor means attached to the elongate member and extending from the elongate member outwardly through the opening to an anchor point to maintain the peripheral edge of the elongate member pressed against the inner wall surface of the conduit.

In another embodiment of my invention, I provide, in combination with a conduit, the improvement comprising means for measuring the flow of a fluid through the conduit by determining the hydraulic grade differential of fluid flowing through the conduit. The conduit includes a central space through which fluid flows along the conduit and includes a wall having an inner surface circumscribing the central space. The central space has, at each point along the length of the conduit, a cross sectional area perpendicular to the direction of flow of fluid through the conduit. The means for measuring fluid flow includes at least one opening formed through the wall of the conduit; an elongate member positioned inside the conduit at a selected location along the conduit to restrict the normal flow of fluid through the conduit and including a peripheral edge shaped and dimensioned to engage the inner surface of the conduit at points circumscribing the opening and an outer surface extending from the peripheral edge outwardly away from the wall into the central space of the conduit to block a portion of the cross sectional area of the conduit at selected points along the length of the conduit, the outer surface including a central planar portion shaped and dimensioned to produce laminar flow in fluid flowing through the restricted portion of the cross sectional area remaining intermediate the central planar portion and a portion of the inner surface opposing and spaced away from the central planar portion; a first aperture formed in the central planar portion and in fluid communication with the restricted portion of the cross sectional area; means extending through the opening and connected to the first aperture to measure the pressure of laminar fluid flow intermediate the central planar portion and the opposing portion of the inner wall surface; a second aperture formed in the wall of the conduit in a portion of the conduit selected from the pair comprising a section of the conduit upstream from the elongate member and a section of the conduit downstream from the elongate member, the upstream and downstream sections having fluid flowing through the cross sectional area of the sections, the second aperture being in fluid communication with the central planar portion of the conduit; means connected to the second aperture to measure the pressure of fluid flowing through the selected portion of the conduit.

Figure 4:
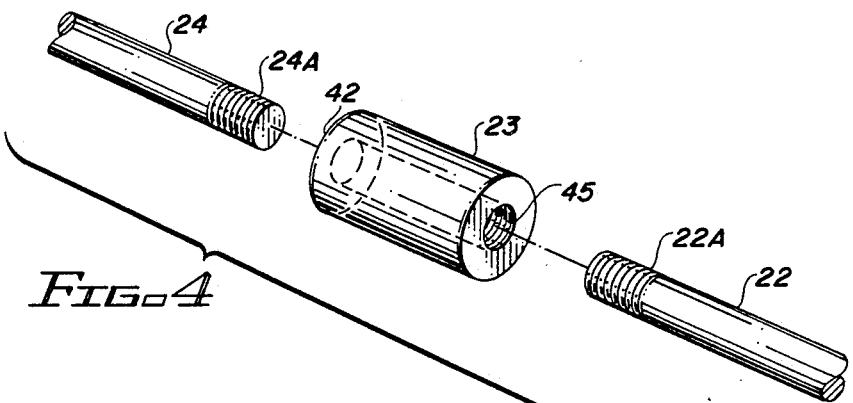
FIG. 4 is an exploded assembly view illustrating the wire tensioning means utilized in the apparatus of FIG. 1; and, FIG. 5 is a perspective view illustrating a spacer used in installing the apparatus of FIG. 1 in a conduit.

Turning now to the drawings, which depict the presently preferred embodiments and best mode of the invention for the purpose of illustrating the practise thereof and not by way of limitation of the scope of the invention and in which like reference characters represent corresponding elements throughout the several views, FIG. 1 illustrates fluid flow measurement apparatus constructed in accordance with the principles of the invention and comprising an elongate member including panel members 10, 11 and 12. Panel member 10 includes arcuate peripheral edge 28. Panel member 11 includes arcuate peripheral edge 27. Panel member 12 includes parallel, straight, spaced apart peripheral edges 40 and 41. Peripheral edges 27, 28, 40, 41 circumscribe the elongate member. Hinge 18 pivotally connects panel member 10 to panel member 12. Hinge 19 pivotally connects panel member 11 to panel member 12. Hinges 18 and 19 are sealingly connected to their respective panel members to prevent the leakage of fluid through hinges 18 and 19. Internally threaded apertures 16 and 17 are formed through panel member 12. Anchor member 25 is fixedly secured to member 10. Anchor member 26 is fixedly secured to member 11. One end of wire 22 is attached to anchor member 26. The other end 22A of wire 22 is externally threaded and is received by internally threaded aperture 45 formed in cylindrical sleeve 23 (FIG. 4). One end of wire 24 is attached to anchor member 25. The other end 24A of wire 24 is externally threaded and is rotatably received by internally threaded aperture 42 formed in cylindrical sleeve 23. Sleeve 23 is rotated in the directions indicated by arrows B to loosen and tension wires 22 and 24. For example, rotating sleeve 23 in a selected direction simultaneously draws both ends 22A and 24A into apertures 42 and 45. Hollow standpipe 15 includes lower externally threaded end 31 which turns into aperture 16. The lower end of anchor wire 13 is connected to member 26. The lower end of anchor wire 14 is connected to member 25. If desired, strips of rubber or other resilient sealing materials can be attached to or comprise peripheral edges 27, 28, 40 and 41 or can be attached along or comprise hinges 18 and 19.

In FIG. 2, conduit 21 includes cylindrical inner surface 35. Fluid flows through conduit 21 in the direction of arrow F. The circular cross sectional area of the central space 43 circumscribed by surface 35 is perpendicular to the direction of travel indicated by arrow F. Opening 20 has been cut through the cylindrical wall 44 of conduit 21. Opening 20 is sized to permit the elongate member of FIG. 1 to be inserted in the direction of arrow A through aperture 20 to be positioned in the manner illustrated in FIG. 3. Alternatively, the elongate member of FIG. 1 can be inserted through an open end of conduit 21 in the direction of arrow M to be positioned in conduit 21 in the manner illustrated in FIG. 3. When the elongate member of FIG. 1 is inserted through an open end of conduit 21, opening 20 can be smaller.

In FIG. 3, anchor wires 13 and 14 extend from members 26 and 25, respectively, upwardly and outwardly through opening 20. The hooks formed on the upper ends of anchors 13 and 14 fixedly engage the peripheral edge of opening 20 to maintain the elongate member of FIG. 1 in the position illustrated in FIG. 3. Anchor wire 13 exerts a force on panel member 11 having components Y2 and X2. Anchor wire 14 exerts a force on panel member 10 having components Y1 and X1. Stops 50 and 51 abut against stops and 52 and 53, respectively, to maintain panel member 12 in a fixed position with respect to panel members 10 and 13. Sleeve 23 is rotated to draw ends 24A and 22A of wires 24 and 22, respectively, into internally threaded apertures 42 and 45 to tension wires 22 and 24 and force peripheral edges 27 and 28 upwardly against inner cylindrical surface 35. When wires 22 and 24 are tensioned, a force is exerted by wire 24 on panel member 10 having components Y1 and X1, while the force exerted by wire 22 on panel member 11 has components Y2 and X2. Peripheral edges 27, 28, 40, and 41 are shaped, contoured and dimensioned such that edges 27, 28, 40, and 41 sealingly continuously contact inner surface 35 along the entire length of edges 27, 28, 40 and 41. Consequently, edges 27, 28, 40 and 41 function to prevent or greatly minimize the flow of fluid intermediate surface 35 and edges 27, 28, 40 and 41 upwardly toward opening 20. Concrete, urethane, or any other desired material can be poured through opening 20 into the space intermediate the opening 20 and the panel members 10, 11, 12. If the concrete or other material poured though opening 20 effectively seals opening 20, then the importance of the seal between edges 27, 28, 40, 41 and surface 35 is minimized. In such a case, edges 27, 28, 40, 41 can contact surface 35 along their entire length and still not effectively prevent fluid from seeping between the edges 27, 28, 40, 41 and surface 35 toward opening 20. Standpipe 15 extends upwardly from aperture 16. Standpipe 30 extends upwardly from aperture 32 formed through the wall 44 of conduit 21.

Figure 5:
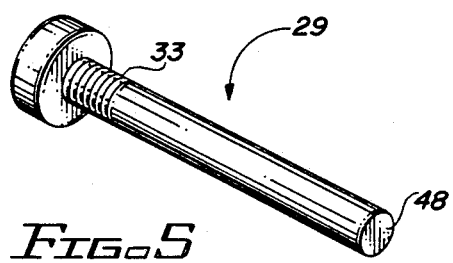

As illustrated in FIG. 5, spacer member 29 includes externally threaded throat 33. Member 29 is shaped and dimensioned such that when member 29 is inserted through aperture 17 in the manner illustrated in FIG. 3, end 48 contacts surface 35 and maintains panel member 12 a selected distance, indicated by arrows C, above the portion of inner surface 35 which is spaced apart from, parallel to, and is directly beneath aperture 17. After anchor wires 13, 14 are used to secure peripheral edges 27, 28, 40 and 41 against outer surface 35 in the manner illustrated in FIG. 3, member 29 can be removed from aperture 17 outwardly through opening 20, and aperture 17 can be plugged.

Panel member 11 includes lower or outer planar semi-elliptical surface 60. Panel member 10 includes lower or outer planar semi-elliptical surface 61. Panel member 12 includes lower or outer planar rectangular surface 62. Surface 62 is parallel to surface 35. While surface 62 is presently preferably flat, surface 62 can take on any desired shape and contour as long as it produces laminar flow intermediate surface 62 and surface 35.

The diameter of conduit 21 is indicated in FIG. 3 by arrows D. The length indicated by arrows L of surface 62 is in the range of 0.5 D to 4 D and preferably is in the range of 1.5 D to 3 D, where D equals the diameter of surface 35 of conduit 21. The distance indicated by arrows C, between surface 62 and surface 35 is in the range of 0.25 D to 0.75 D and preferably is in the range 0.375 D to 0.625 D, where D equals the diameter of cylindrical surface 35 of conduit 21. The width of the panel member 12 in the presently preferred embodiment of the invention is indicated by arrows D in FIG. 1, i.e., the width equal the diameter of surface 65. In other words, the width of member 12 is equal to the width of the portion of surface 35 intersected by an imaginary plane which is parallel to surface 35 and is a distance from surface 35 indicated by arrows C.

In use, an opening 20 is cut through the wall 44 of a conduit 21. The elongate member of FIG. 1 is inserted through aperture 20 (or through an open end of the conduit) to a position inside conduit 21. Spacer 29 is inserted through aperture 17 to position surface 62 a selected distance, indicated by arrows C, away from surface 35. Throat 33 of spacer 29 is threaded into aperture 17. Anchor wires 13, 14 are attached to the edge circumscribing opening 20. Sleeve 23 is rotated to tension wires 22 and 24. Spacer 29 is removed from aperture 17 and aperture 17 is plugged. If not already so inserted, the lower end 31 of hollow standpipe 15 is threaded into aperture 16 in the manner shown in FIG. 3. Internally threaded aperture 32 is formed through wall 44 of conduit 21. The lower threaded end of standpipe 30 is turned into aperture 32. Standpipe 30 is identical to standpipe 15. Any desired means can be used to sealingly insert the lower end of standpipe 30 in aperture 32. If desired, an L-shaped standpipe can be attached to an aperture 32A formed through wall 44. The distal end of the lower leg of the L-shaped standpipe is sealingly inserted in aperture 32A. The upper leg of the L-shaped standpipe extends upwardly from the lower leg. If desired, concrete, urethane, or other material can be poured through aperture 20 into the area intermediate opening 20 and the elongate member to seal opening 20 and provide structural strength for conduit 21. Water or another fluid is permitted to flow through conduit 21 in the direction of arrows F. As shown in FIG. 3, water flowing through conduit 21 upstream of panel member 11 flows in laminar fashion in a direction parallel to inner surface 35. Member 11 downwardly deflects the water through the area bounded by surface 62 and the portion of surface 35 located beneath surface 62. Water flows intermediate surface 62 and surface 35 in laminar fashion and flows beneath and past panel member 10 into the downstream portion of conduit 21. The portions of conduit 21 upstream and downstream from the elongate member of FIG. 1 have a central space which has the normal circular cross sectional area of conduit 21. The space 70 intermediate surfaces 62 and 35 has a semi-circular cross sectional area.

When the elongate member of FIG. 1 is installed in a conduit 21 in the manner illustrated in FIG. 3, surface 60 preferably is sloped and is not perpendicular with respect to the laminar direction of flow of water upstream from surface 60. The sloped orientation of surface 60 facilitates the deflection of water intermediate surface 62 and surface 35 and also minimizes the amount of turbulence produced by such deflection. The sloped orientation of surface 61 is less critical than the sloped orientation of surface 60. If desired, panel member 10 and stops 50 and 52 can be shaped and dimensioned such that surface 61 is perpendicular to the laminar direction of flow F of water through conduit 21 or such that surface 61 is in any other desired orientation. Instead of anchor wires 13 and 14, sleeve 23 and wires 22 and 24, stops 50 and 52 and 51 and 53, any other desired structure which is attached to panel members 10, 11, and/or 12 and extends outwardly through aperture 20 to an anchor location exterior of conduit 21 can be utilized to maintain panel members 10, 11, 12 and peripheral edges 27, 28, 40 and 41 in position against inner surface 35 in the manner illustrated in FIG. 3.

If desired, panel members 10 and 11 can be fixedly secured to panel member 12 and need not be pivotally secured to member 12 with hinges 18 and 19. Members 10, 11 and 12 can form a unitary member having a peripheral edge which, like edges 27 and 28 and 40 and 41, continuously contacts surface 35 at points along a line circumscribing opening 20. Though not particularly practical, surface 60 can take on an orientation perpendicular to the laminar direction of flow of fluid through conduit 21 or can take on any other desired orientation.

When fluid is flowing through the apparatus of FIG. 3, the height that fluid rises upwardly into standpipe 30 and the height that fluid rises upwardly in standpipe 15 permits, as is well known, the hydraulic grade differential to be determined. The flow of fluid through conduit 21 is readily derived using this hydraulic grade differential. If the fluid flowing through conduit 21 is carrying a substantial amount of air, standpipe 30 can be used as a vent, while an L-shaped standpipe connected to opening 32A can be used to determine the hydraulic grade differential.

Since the diameter D of surface 35 is known and the dimensions of panel members 10, 11, 12 are known, the circular cross sectional area of conduit 21 is known along with the semi-circular cross sectional area intermediate surfaces 62 and 35.

As would be appreciated by those of skill in the art, the invention can be utilized in conduit having an inner surface which has an elliptical shape, a rectangular shape, a semi-cylindrical shape, or has any other desired shape and dimension.

Having described my invention in such terms as to enable those skilled in the art to understand and practise it, and having identified the presently preferred embodiments thereof,

I claim:

1. In combination with a conduit, the conduit including a central space through which fluid flows along the conduit, the central space having at each point along the length of the conduit a cross sectional area perpendicular to the direction of fluid flow through the conduit, and a wall having an inner surface circumscribing the central space, the improvement comprising means for measuring the flow of a fluid through the conduit by determining the hydraulic grade differential of fluid flowing through the conduit, said means including (a) at least one opening formed through the wall of the conduit;

(b) an elongate member positioned inside the conduit at a selected location along the conduit to restrict the normal flow of fluid through the conduit and including (i) a peripheral edge shaped and dimensioned to generally sealingly continuously engage the inner surface of the conduit at points circumscribing said opening to prevent fluid from flowing intermediate the inner wall surface and said peripheral edge and out from the conduit through said opening, and (ii) an outer surface extending from said peripheral edge outwardly away from said wall into the central space of the conduit to restrict a portion of the cross sectional area of the conduit at selected points along a portion of the length of the conduit, the outer surface including a central planar portion shaped and dimensioned to produce laminar flow in fluid flowing through the restricted portion of the cross sectional area remaining intermediate said central planar portion and a portion of the inner surface opposing and spaced away from said central planar portion;

(c) a first aperture formed through said central planar portion and in fluid communication with said restricted portion of the cross sectional area;

(d) means connected to said first aperture to measure the pressure of laminar fluid flow intermediate said central planar portion and said opposing portion of the inner surface;

(e) a second aperture formed through the wall of the conduit in a portion of the conduit selected from the pair comprising (i) a section of the conduit upstream from the elongate member, and (ii) a section of the conduit downstream from said elongate member, said upstream and downstream sections having fluid flowing through the cross sectional area of said sections of the conduit, said second aperture being in fluid communication with the central planar portion of the conduit;

(f) means connected to said second aperture to measure the pressure of fluid flowing through said portion of said conduit; and, (g) anchor means attached to said elongate member and extending from said elongate member outwardly through said opening to an anchor point to maintain said peripheral edge of said elongate member pressed against the inner wall surface of the conduit.

2. In combination with a conduit, the conduit including a central space through which fluid flows along the conduit, the central space having at each point along the length of the conduit a cross sectional area perpendicular to the direction of fluid flow through the conduit, and a wall having an inner surface circumscribing the central space, the improvement comprising means for measuring the flow of a fluid through the conduit by determining the hydraulic grade differential of fluid flowing through the conduit, said means including (a) at least one opening formed through the wall of the conduit;

(b) an elongate member positioned inside the conduit at a selected location along the conduit to restrict the normal flow of fluid through the conduit and including (i) a peripheral edge shaped and dimensioned to engage the inner surface of the conduit at points circumscribing said opening, and (ii) an outer surface extending from said peripheral edge outwardly away from said wall into the central space of the conduit to restrict a portion of the cross sectional area of the conduit at selected points along a portion of the length of the conduit, the outer surface including a central planar portion shaped and dimensioned to produce laminar flow in fluid flowing through the restricted portion of the cross sectional area remaining intermediate said central planar portion and a portion of the inner surface opposing and spaced away from said central planar portion;

(c) a first aperture formed through said central planar portion and in fluid communication with said restricted portion of the cross sectional area;

(d) means extending through said opening and connected to said first aperture to measure the pressure of laminar fluid flow intermediate said central planar portion and said opposing portion of the inner surface;

(e) second aperture formed through the wall of the conduit in a portion of the conduit selected from the pair comprising (i) a section of the conduit upstream from the elongate member, and (ii) a section of the conduit downstream from said elongate member, said upstream and downstream sections having fluid flowing through the cross sectional area of said sections of the conduit, said second aperture being in fluid communication with the central planar portion of the conduit; and, (f) means connected to said second aperture to measure the pressure of fluid flowing through said portion of said conduit.

* * * * *